(12) United States Patent
Inoue et al.

(10) Patent No.: US 6,736,174 B2
(45) Date of Patent: May 18, 2004

(54) PNEUMATIC TIRE HAVING THIN TREAD REINFORCING LAYER EMBEDDED IN THE OUTERMOST LAYER OF A TREAD PORTION

(75) Inventors: Takumi Inoue, Kodaira (JP); Tomohiro Kusano, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 118 days.

(21) Appl. No.: 09/949,719

(22) Filed: Sep. 12, 2001

(65) Prior Publication Data

US 2002/0050313 A1 May 2, 2002

(30) Foreign Application Priority Data

Sep. 13, 2000 (JP) ......................................... 2000-277626

(51) Int. Cl.[7] .............................. B60C 1/00; B60C 9/12; B60C 11/00
(52) U.S. Cl. .............................. 152/154.2; 152/209.4; 152/209.5; 152/458
(58) Field of Search .......................... 152/154.2, 208, 152/209.4, 209.5, 211, 212, 458

(56) References Cited

U.S. PATENT DOCUMENTS

| | | | |
|---|---|---|---|
| 2,675,047 A | * | 4/1954 | Andy |
| 3,225,812 A | * | 12/1965 | Barrett |
| 3,759,306 A | * | 9/1973 | Greiner et al. |
| 5,526,859 A | * | 6/1996 | Saito et al. |
| 5,614,041 A | * | 3/1997 | Dumke et al. |
| 5,840,137 A | * | 11/1998 | Futamura |
| 6,095,217 A | * | 8/2000 | Nakamura et al. |

FOREIGN PATENT DOCUMENTS

| | | |
|---|---|---|
| EP | 0 105 822 A2 | 4/1984 |
| EP | 0 715 974 A1 | 6/1996 |
| GB | 2297297 | * 7/1996 |
| GB | 2303590 | * 2/1997 |
| JP | 2001-206012 | * 7/2001 |

OTHER PUBLICATIONS

*Patent Abstracts of Japan*, vol. 015, No. 174 (M–1109)(May 2, 1991) & JP 03–038416 assigned to Bridgestone Corp. (Feb. 19, 1991).
*Patent Abstracts of Japan*, vol. 016, No. 523 (M–1331)(Oct. 27, 1992) & JP 04–193609 assigned to Bridgestone Corp., et al. (Jul. 13, 1992).

* cited by examiner

*Primary Examiner*—Steven D. Maki
(74) *Attorney, Agent, or Firm*—Sughrue Mion, PLLC

(57) ABSTRACT

In a pneumatic tire of the present invention, a tread reinforcing rubber layer composed of a rubber having larger tensile modulus of elasticity than that of a rubber composing the tread rubber layer and is less stretchable is provided in a thickness direction central area of a tread rubber layer. Because the tread reinforcing rubber layer diminishes the amount of lateral expansion and the amount of vertical compressive deformation when the tread rubber layer contacts the ground, generation of heat in the tread rubber layer can be suppressed. Therefore, in the present invention, the unique tread structure reliably suppresses heat-generation and the rubber of the tread rubber layer exhibits excellent tire wear resistance. As a result, suppression of heat-generation and high tire resistance can readily be achieved simultaneously.

11 Claims, 14 Drawing Sheets

PNEUMATIC TIRE HAVING THIN TREAD REINFORCING LAYER EMBEDDED IN THE OUTERMOST LAYER OF A TREAD PORTION

BACKGROUND OF THE INVENTION

1. Field of the Invention

The present invention relates to a pneumatic tire in which heat-generation can be controlled and tire wear resistance can be improved simultaneously. More particularly, the present invention relates to a pneumatic tire suitable for off-the-road, for example vehicle for construction in which deterioration in tire wear resistance is minimized and tire life can be prolonged by suppressing generation of heat.

2. Description of the Related Art

Conventionally, in order to suppress generation of heat in a tread of a pneumatic tire, physical properties of a rubber material of a tread rubber layer have been controlled.

However, because deterioration in tire wear resistance generally arises in tread rubbers which have physical properties controlled so as to suppress generation of heat, it was difficult to suppress generation of heat without causing any deterioration of tire wear resistance.

SUMMARY OF THE INVENTION

In view of the aforementioned facts, an object of the present invention is to provide a pneumatic tire in which generation of heat can be suppressed without causing any deterioration of tire wear resistance.

In order to attain the above object, a first aspect of the present invention is a pneumatic tire which comprises: a tread portion constituted with a tread rubber layer and including grooves formed at a radially outer surface thereof i.e., a tread surface of a tire; and a thin tread reinforcing layer provided at a middle portion, in the thickness direction ("the thickness direction" indicates the direction normal to the tread surface as the ground-contacting portion hereinafter), of the tread rubber layer so as to extend over at least one portion of the tread rubber layer in the tire widthwise direction thereof, the tread reinforcing layer being composed of a material (such as rubber) having larger tensile modulus of elasticity than that of a rubber composing the tread rubber layer. Note that the aforementioned expression of "the middle portion" indicates the middle portion of a gauge of the tread rubber layer in the thickness direction.

A pneumatic tire according to the first aspect achieves the following effects.

FIG. 14A is a schematic view of a conventional tread rubber layer. The tread rubber layer 100, when contacting the ground, undergoes compressive deformation in the vertical direction thereof due to force F, and a middle portion of the tread rubber layer 100 in the vertical direction thereof expands in the lateral direction.

When a tire rotates during running, the tread rubber layer 100 repeatedly undergoes the above-described deformation and generates heat.

As shown in FIG. 14B, the pneumatic tire according to the present aspect includes a tread reinforcing layer 102 (for example, the tread reinforcing rubber layer) which is composed of a material (e.g., rubber) having larger tensile modulus of elasticity, i.e., being less stretchable than a rubber composing the tread rubber layer 100, at the middle portion of the tread rubber 100 in the vertical (thickness) direction thereof. The tread reinforcing layer 102 suppresses the lateral expansion of the tread rubber layer 100. As a result, the compressive deformation of the tread rubber layer 100 is also suppressed.

As the amount of lateral expansion and the amount of vertical compressive deformation is decreased, generation of heat in the tread rubber layer can be suppressed.

According to the present aspect, providing the tread reinforcing layer (the aforementioned tread reinforcing rubber layer, for example) can effectively suppress generation of heat in the tread rubber layer. In the case of a tread structure which includes the tread reinforcing rubber layer as described above, in addition to suppression of heat-generation, tire wear resistance can be ensured by choosing the rubber having physical property for tire wear resistance of the tread rubber layer. Thus, suppression of heat-generation is readily achieved without causing any deterioration of tire wear resistance.

In a second aspect of the present invention, in the pneumatic tire having the first aspect, a thickness of the tread reinforcing layer is in a range of from 2 to 5% of a thickness of the tread rubber layer.

A pneumatic tire according to the second aspect achieves the following effects.

When the thickness of the tread reinforcing layer is less than 2% of the thickness of the tread rubber layer, the capacity of the tread reinforcing layer to suppress the lateral expansion of the tread rubber layer is lowered.

On the other hand, when the thickness of the tread reinforcing layer exceeds 5% of the thickness of the tread rubber layer, the influence of the wear resistance of the tread reinforcing layer on the wear property of the entire tread rubber layer will increase to such an extent that it cannot be ignored. In addition, the influence of the heat generated by the tread reinforcing layer on the heat-generation property of the entire tread rubber layer will increase to such an extent that it cannot be ignored.

Accordingly, it is preferable to set the thickness of the tread reinforcing layer to the range of from 2 to 5% of the thickness of the tread rubber layer.

In a third aspect of the present invention, in the pneumatic tire having the first and second aspects and including the tread reinforcing rubber layer, tensile stress at 50% elongation of the rubber composing the tread reinforcing rubber layer is in a range of from 2 to 4 times as large as the tensile stress at 50% elongation of the rubber composing the tread rubber layer.

A pneumatic tire according to the third aspect achieves the following effects.

When the tensile stress at 50% elongation of the rubber composing the tread reinforcing rubber layer is less than 2 times as large as the tensile stress at 50% elongation of the rubber composing the tread rubber layer, the capacity of the tread reinforcing rubber layer to suppress the lateral expansion of the tread rubber layer is lowered.

On the other hand, when the tensile stress at 50% elongation of the rubber composing the tread reinforcing rubber layer exceeds 5 times as large as the tensile stress at 50% elongation of the rubber composing the tread rubber layer, there is a possibility that the rubber layers of different types (physical properties) separate from each other.

Accordingly, it is preferable to set the tensile stress at 50% elongation of the rubber composing each tread reinforcing rubber layer to the range of from 2 to 4 times as large as the tensile stress at 50% elongation of the rubber composing the tread rubber layer.

In a case in which a plurality of tread rubber layers are used, the tensile stress at 50% elongation of each tread reinforcing rubber layer must be set to the range of from 2 to 4 times as large as a tensile stress at 50% elongation of an adjacent rubber composing the tread rubber layer.

In a fourth aspect of the present invention, in the pneumatic tire having any one of above aspects, the tread rubber layer is made up of a plurality of rubber layers stacked in the tire radial direction, and each of the plurality of rubber layers has different physical properties.

A pneumatic tire according to the fourth aspect achieves the following effects.

If only one type of rubber is used, there may be cases where properties which are incompatible to each other cannot be improved simultaneously. In the pneumatic tire according to the present aspect, however, tire wear resistance and suppression of heat-generation can be further improved, simultaneously, with a structure in which, for example, an outer layer in the tread rubber layer at a ground-contact surface side thereof is composed of an NR-based or a SBR-based cap rubber which improves tire wear resistance, and an inner layer in the tread rubber layer near a carcass side thereof is composed of an NR-based base rubber which suppresses generation of heat.

In a fifth aspect of the present invention, in the pneumatic tire having any one of above aspects, a position depth that is a distance from the tread surface to the outer side of the tread reinforcing layer in the thickness direction when the tire is new is in a range of 10 to 30% of a depth of a groove when the tire is new.

A pneumatic tire according to the fifth aspect achieves the following effects.

Suppression of heat-generation in the tread rubber layer is necessary for a new or a slightly worn tire in which the tread rubber layer is thick (i.e., the tread rubber layer makes relatively large movements and is hard to release heat). Accordingly, it suffices that the effect of the tread reinforcing rubber layer is achieved only in a period when the tire is new or slightly worn. After this period, the effect of the tread reinforcing layer may be diminished or lost.

According to the present aspect, by setting the a position depth that is a distance from the tread surface to the outer side of the tread reinforcing layer in the thickness direction when the tire is new to a range of from 10 to 30% of the depth of the groove of a new tire, the effect of the tread reinforcing layer to suppress the heat-generation is achieved in an optimal state in the period when the tire is new or slightly worn during which suppression of heat-generation is most often required.

In a sixth aspect of the present invention, in the pneumatic tire having any one of above aspects, the material (e.g., rubber) composing the tread reinforcing layer has different color (specifically, color, brightness and saturation) than that of the rubber composing adjacent tread rubber layer, and the a position depth that is a distance from the tread surface to the outer side of the tread reinforcing layer in the thickness direction when the tire is new is set to 30% of the depth of the groove of a new tire.

A pneumatic tire according to the sixth aspect achieves the following effects.

When the material (e.g., rubber) composing the tread reinforcing layer has different color (color, brightness and saturation) than that of the rubber composing an adjacent tread rubber layer disposed at the radially outer side of the tread reinforcing layer, it can visually and thus easily be recognized that the tread reinforcing layer appears at the tread surface as a result of wear because the color (color, brightness and saturation) of the tread surface changes as the tire is used.

As black rubber is commonly used for tires, if the same black color is used for the tread reinforcing layer, it is preferable to alter the color (color, brightness and saturation) of the tread reinforcing layer from that of the adjacent tread rubber. Alternatively, it is preferable to employ a different color (other than black) for the component material of the tread reinforcing layer.

In the case of pneumatic tires for a construction vehicle, under a normal usage condition, front and rear tires are removed and re-mounted at different positions at the time when the tread rubber layer is worn by 30% (the tread rubber layer is supposed to be "worn" by 100% when the groove disappears).

Accordingly, by setting the a position depth that is a distance from the tread surface to the outer side of the tread reinforcing layer in the thickness direction when the tire is new to 30% of the depth of the groove of a new tire, it can visually and easily be recognized that the tire is worn by 30% when the tread reinforcing layer of different color (color, brightness and saturation) appears at the tread surface.

In a seventh aspect of the present invention, in the pneumatic tire having any one of above aspects, short fibers are added in the tread reinforcing layer.

A pneumatic tire according to the seventh aspect achieves the following effects.

Because the short fibers are added in the tread reinforcing layer, the tread reinforcing layer can be made less stretchable than the rubber composing the tread rubber layer.

In addition, according to the present aspect, when the tread reinforcing layer is provided as the tread reinforcing rubber layer, the tread reinforcing rubber layer can be prepared by adding short fibers in the rubber of the same type as that composing the tread rubber layer. As a result, a common rubber can be used for both the tread rubber layer and the tread reinforcing rubber layer.

In an eighth aspect of the present invention, in the pneumatic tire having the seventh aspect, the short fibers are oriented in a plane which is substantially parallel to the surface of the tread reinforcing layer.

A pneumatic tire according to the eighth aspect achieves the following effects.

When the short fibers are added in the material (e.g., rubber) composing the tread reinforcing layer, the tread reinforcing layer is made less stretchable when the short fibers are oriented parallel to the surface of the tread reinforcing layer than when they are oriented parallel to the thickness direction of the tread reinforcing layer.

Accordingly, it is preferable that the short fibers are oriented in a plane which is substantially parallel to the surface of the tread reinforcing layer.

By continuously extruding, from a slit-like extrusion port of an extruder, an unvulcanized rubber in which the short fibers are added, the short fibers can be oriented in a plane which is substantially parallel to the surface of the tread reinforcing layer.

In a ninth aspect of the present invention, in the pneumatic tire having any one of the first, second, fourth, and fifth aspects, a rubber-fiber composite structure including fibers having larger tensile modulus of elasticity than that of the rubber composing the tread rubber layer is provided as the tread reinforcing layer, in place of the tread reinforcing rubber layer.

A pneumatic tire according to the ninth aspect achieves the following effects.

In the pneumatic tire according to the present aspect, the rubber-fiber composite structure which includes fibers having larger tensile modulus of elasticity than that of the rubber composing the tread rubber layer and is less stretchable than the tread rubber layer is provided in a middle portion, in the thickness direction, of the tread rubber layer. Because the rubber-fiber composite structure suppresses lateral expansion of the tread rubber layer when the tread rubber layer contacts ground, the amount of compressive deformation of the tread rubber layer can be made small.

As the rubber-fiber composite structure diminishes the amount of lateral expansion and the amount of vertical compressive deformation of the tread rubber layer, generation of heat in the tread rubber layer can be suppressed.

In short, according to the present aspect, generation of heat in the tread rubber layer can be effectively suppressed by providing the rubber-fiber composite structure. In addition, tire wear resistance can be ensured by choosing the rubber having physical property for tire wear resistance of the tread rubber layer. Therefore, suppression of heat-generation is readily achieved without causing any deterioration of tire wear resistance.

Further, according to the present aspect, because the direction in which the tread rubber layer is less stretchable can be controlled or adjusted by the orientation of the fibers in the rubber-fiber composite structure, it is possible to set the orientation of the fibers to a direction in which the suppression of heat-generation in the tread rubber layer can be most effectively achieved.

In a tenth aspect of the present invention, in the pneumatic tire having the ninth aspect, the rubber-fiber composite structure is disposed substantially parallel to the tread surface.

According to the tenth aspect, by disposing the rubber-fiber composite structure substantially parallel to the tread surface, the effect of suppressing the lateral expansion of the tread rubber layer can further be improved.

DESCRIPTION OF THE PREFERRED EMBODIMENTS

An embodiment of a pneumatic tire of the present invention will be hereinafter described with reference to Figures.

Figure 1:
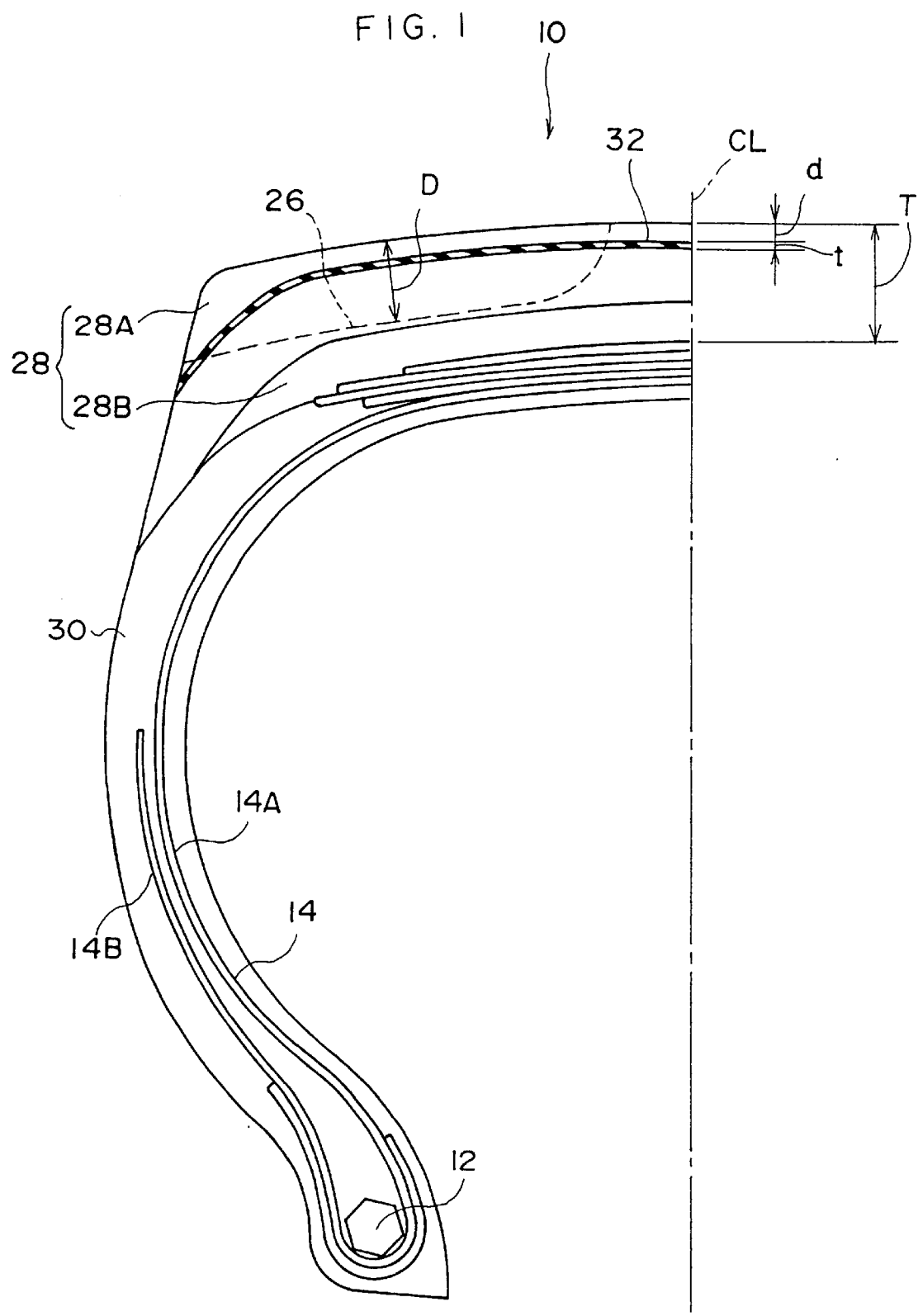
FIG. 1 is a cross-sectional view of a pneumatic tire relating to an embodiment of the present invention along an axis thereof.

As shown in FIG. 1, a pneumatic tire 10 of the present embodiment includes a pair of bead cores 12, and a carcass 14 which is made up of a steel cord disposed around the bead core 12 in a toroidal manner and disposed in the tire radial direction.

The carcass 14 consists of a main body 14A disposed at the axially inner side of the bead core 12 and extends from one bead core 12 to another, and folded portions 14B each of which is folded toward the outer side, in the tire widthwise direction, around the bead core 12.

A belt 22, made up of a plural layers of belt plies, is disposed at the radially outer side of the carcass 14. A number of steel cords are buried in each belt ply such that the steel cords are inclined with respect to the circumferential direction of the tire. The steel cords of one belt ply intersect the steel cords of another adjacent belt ply in the top view.

A tread rubber layer 28 is disposed at the radially outer side of the belt 22. On the tread rubber layer 28, there are provided lug grooves 26. Side rubber layers 30 are disposed at the both axially outer sides of the carcass 14.

Tread Rubber Layer

The tread rubber layer 28 of the present embodiment has a two-layer structure which consists of a cap rubber layer 28A which is the tread surface side layer in the tire radial direction and a base rubber layer 28B which is the carcass side layer in the tire radial direction.

The cap rubber material composing the cap rubber layer 28A is an NR-, or SBR-based rubber which is excellent in wear resistance, and the base rubber material composing the base rubber layer 28B is an NR-based rubber which is excellent in suppression of heat-generation and suppression of crack generation.

A sheet-like tread reinforcing rubber layer 32 (as one example of the claimed tread reinforcing layer) of predetermined thickness is provided such that the tread reinforcing rubber layer 32 extends in the tire circumferential direction and the tire widthwise direction over the entire cap rubber layer 28A.

It is preferable that a tensile stress at 50% elongation of a rubber composing the tread reinforcing rubber layer 32 is in a range of from 2 to 4 times as large as a tensile stress at 50% elongation of a rubber component composing the tread rubber layer 28, which rubber component is the one that has the largest value of tensile stress at 50% elongation among the rubber components composing the tread rubber layer.

In order to increase the value of the tensile stress at 50% elongation of a rubber, known methods in the art can be employed. These methods include: changing the type of rubber; blending rubbers of different types; and increasing the amount of the filler in the rubber.

It is preferable that the thickness of the tread reinforcing rubber layer 32 is in a range of from 2 to 5% of the thickness of the tread rubber layer 28.

It is preferable that the (position) depth d that is a distance from the tread surface of the tread rubber layer 28 to the outer side of the tread reinforcing layer 32 in the thickness direction when the tire is new is in a range of from 10 to 30% of the depth D of the groove of a new tire.

In the pneumatic tire 10 of the present embodiment, the tensile stress at 50% elongation of the cap rubber layer 28A is 1.1 Mpa, the tensile stress at 50% elongation of the base rubber layer 28B is 1.0 Mpa, and the tensile stress at 50% elongation of the tread reinforcing rubber layer 32 is 2.2 Mpa. The tensile stress at 50% elongation of the tread reinforcing rubber layer 32 is 2 times as large as the tensile stress at 50% elongation of the cap rubber layer 28A.

The thickness t of the tread reinforcing rubber layer 32 is 3 mm and the thickness T of the tread rubber layer 28 is 102 mm. Accordingly, the thickness t of the tread reinforcing rubber layer 32 is approximately 2.9% of the thickness T of the tread rubber layer 28.

The depth d at which the tread reinforcing rubber layer 32 is provided, measured from the tread surface of the tread rubber layer 28, is set to be 18 mm and the depth D of the lug groove 26 of a new tire is set to be 88 mm. Accordingly, the depth d is set to be 20% of the depth D.

Effect of the Present Invention

Next, the effect of the pneumatic tire 10 of the present embodiment will be described.

As a pneumatic tire 10 is rotated during running, the tread rubber layer 28, when contacting the ground, undergoes compressive deformation in the tire radial direction, and a middle portion of the tread rubber layer 28 in the tire radial direction expands in the direction parallel to the tread surface.

The tread rubber layer 28 repeatedly undergoes the above deformation and generates heat.

However, in the present embodiment, because the tread reinforcing rubber layer 32 having high tensile stress at 50% elongation and is less stretchable suppresses the above-described lateral expansion, the amount of compressive deformation decreases. Therefore, the lateral expansion and the vertical compressive deformation can both be suppressed. In addition, according to the pneumatic tire 10 of the present embodiment, the rubber material composing the cap rubber layer 28A is an NR-, or SBR-based rubber which is excellent in wear resistance, and the rubber material composing the base rubber layer 28B is an NR-based rubber which is excellent in suppression of heat-generation. As a result, in the present pneumatic tire 10, excellent wear resistance and reliable suppression of heat-generation can simultaneously be achieved.

When the thickness t of the tread reinforcing rubber layer 32 is less than 2% of the thickness T of the tread rubber layer 28, the capacity of the tread reinforcing rubber layer 32 to suppress the lateral expansion of the tread rubber layer 28 decreases.

On the other hand, when the thickness t of the tread reinforcing rubber layer 32 exceeds 5% of the thickness T of the tread rubber layer 28, the influence of the wear resistance of the tread reinforcing rubber layer 32 on the wear property of the entire tread rubber layer 28 will also increase to such an extent that it cannot be ignored. In addition, the influence of the heat-generation property of the tread reinforcing rubber layer 32 on the heat-generation property of the entire tread rubber layer 28 will also increase to such an extent that it cannot be ignored.

When the tensile stress at 50% elongation of the rubber composing the tread reinforcing rubber layer 32 is less than 2 times as large as the tensile stress at 50% elongation of the rubber composing the cap rubber layer 28A, the capacity of the tread reinforcing rubber layer 32 to suppress the lateral expansion of the tread rubber layer 28 decreases.

On the other hand, when the tensile stress at 50% elongation of the rubber composing the tread reinforcing rubber layer 32 exceeds 5 times as large as the tensile stress at 50% elongation of the rubber composing the cap rubber layer 28A, there is a possibility that the rubber layers of different types separate from each other.

As described above, the depth d at which the tread reinforcing rubber layer 32 is provided, measured from the tread surface of the tread rubber layer 28, is set to be 20% of the depth D of the lug groove 26 of a new tire. Therefore, the effect of the tread reinforcing rubber layer 32 to suppress the heat-generation can be optimally achieved in the period when the tire is new or slightly worn during which suppression of heat-generation is most required.

Other Embodiments

Although the tread reinforcing rubber layer 32 is provided such that the tread reinforcing rubber layer 32 extends in the tire circumferential direction and the tire widthwise direction over the entire cap rubber layer 28A, the pneumatic tire of the present invention is not limited to the same structure. The tread reinforcing rubber layer 32 may be optionally provided to the area where the amount of heat-generation is large.

Figure 2:
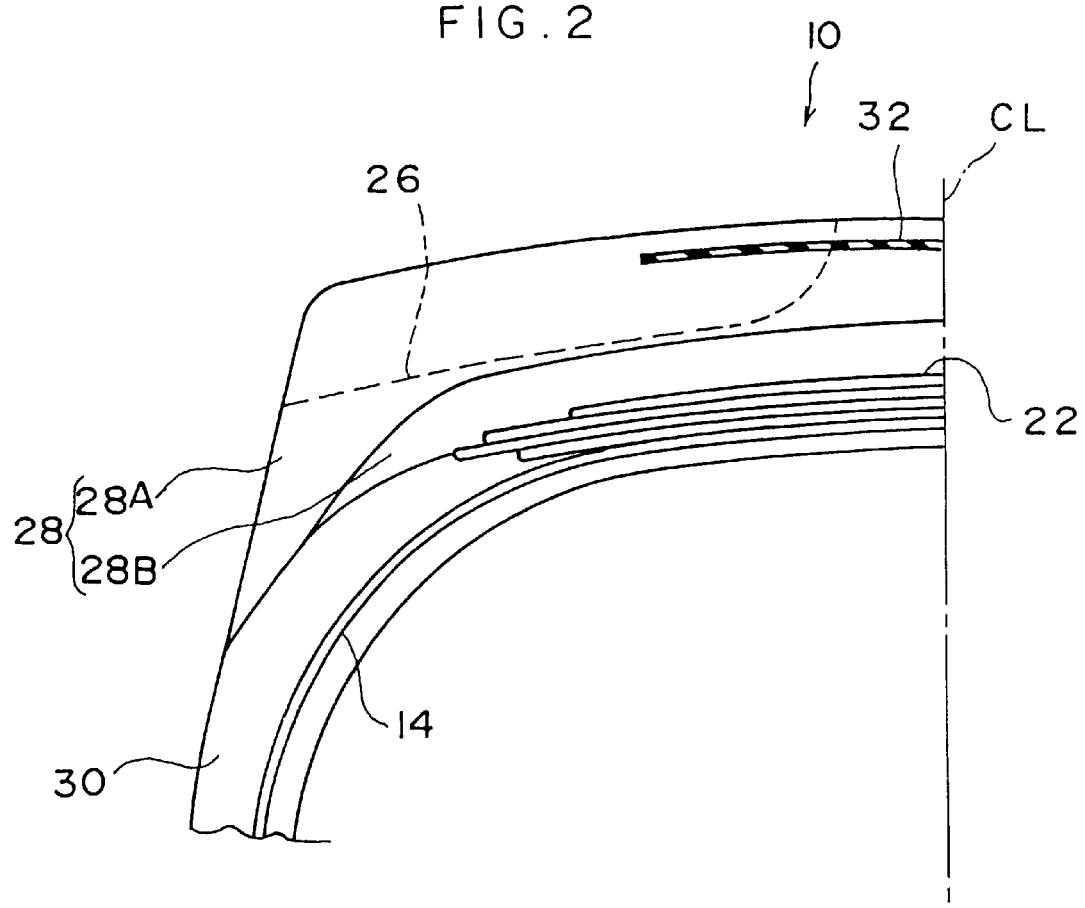
FIG. 2 is a cross-sectional view of a vicinity of a tread of a pneumatic tire relating to another embodiment of the present invention.
Figure 3:
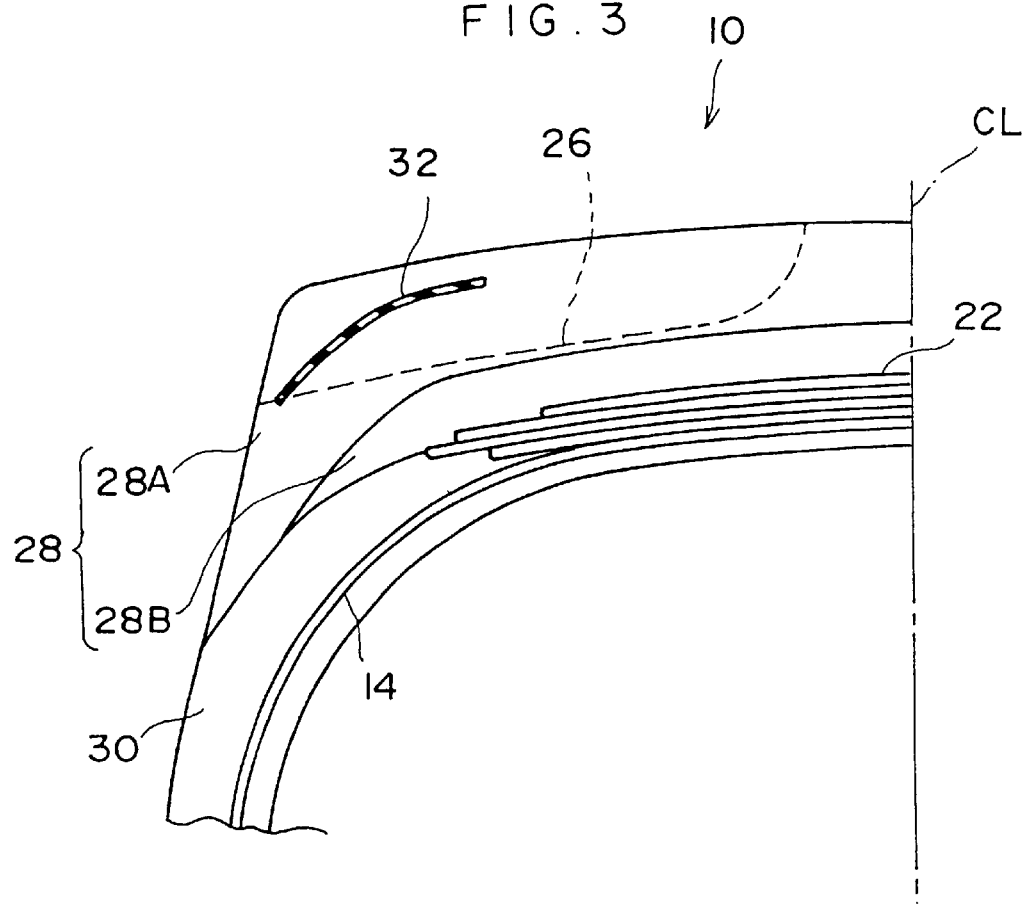
FIG. 3 is a cross-sectional view of a vicinity of a tread of a pneumatic tire relating to still another embodiment of the present invention.
Figure 4:
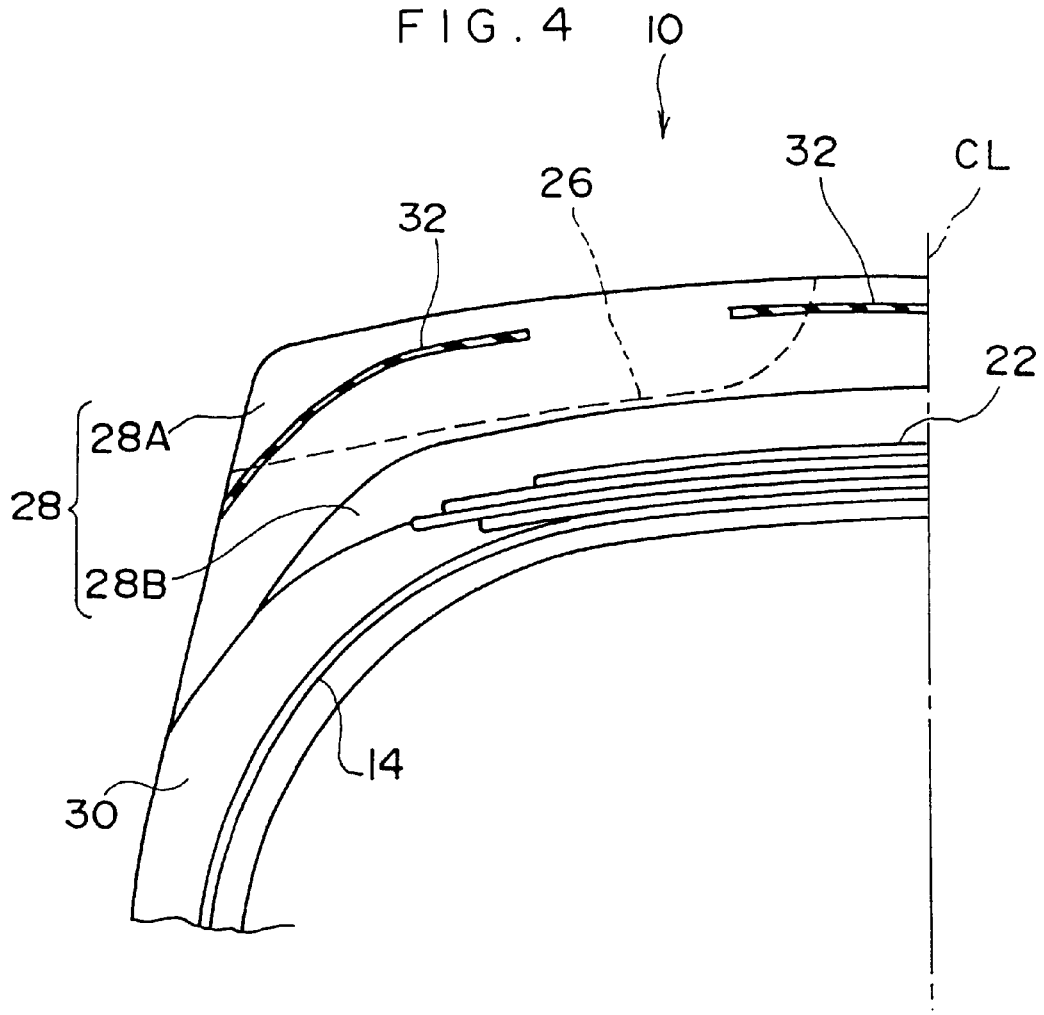
FIG. 4 is a cross-sectional view of a vicinity of a tread of a pneumatic tire relating to a further embodiment of the present invention.

For example, if heat-generation in the vicinity of the center of the tread needs to be suppressed, the tread reinforcing rubber layer 32 may be provided only in the vicinity of the center of the tread as shown in FIG. 2. If heat-generation in the vicinity of a shoulder portion needs to be suppressed, the tread reinforcing rubber layer 32 may be provided only in the vicinity of the shoulder portion as shown in FIG. 3. Alternatively, if heat-generation in the vicinity of the shoulder portion and in the vicinity of the center of the tread needs to be suppressed, the tread reinforcing rubber layers 32 may be provided at those two areas as shown in FIG. 4.

Further, although the pneumatic tire 10 of the aforementioned embodiment includes only one tread reinforcing rubber layer 32, the structure is not limited to this example. Specifically, the pneumatic tire 10 of the present invention may include two or more tread reinforcing rubber layers 32.

Figure 5:
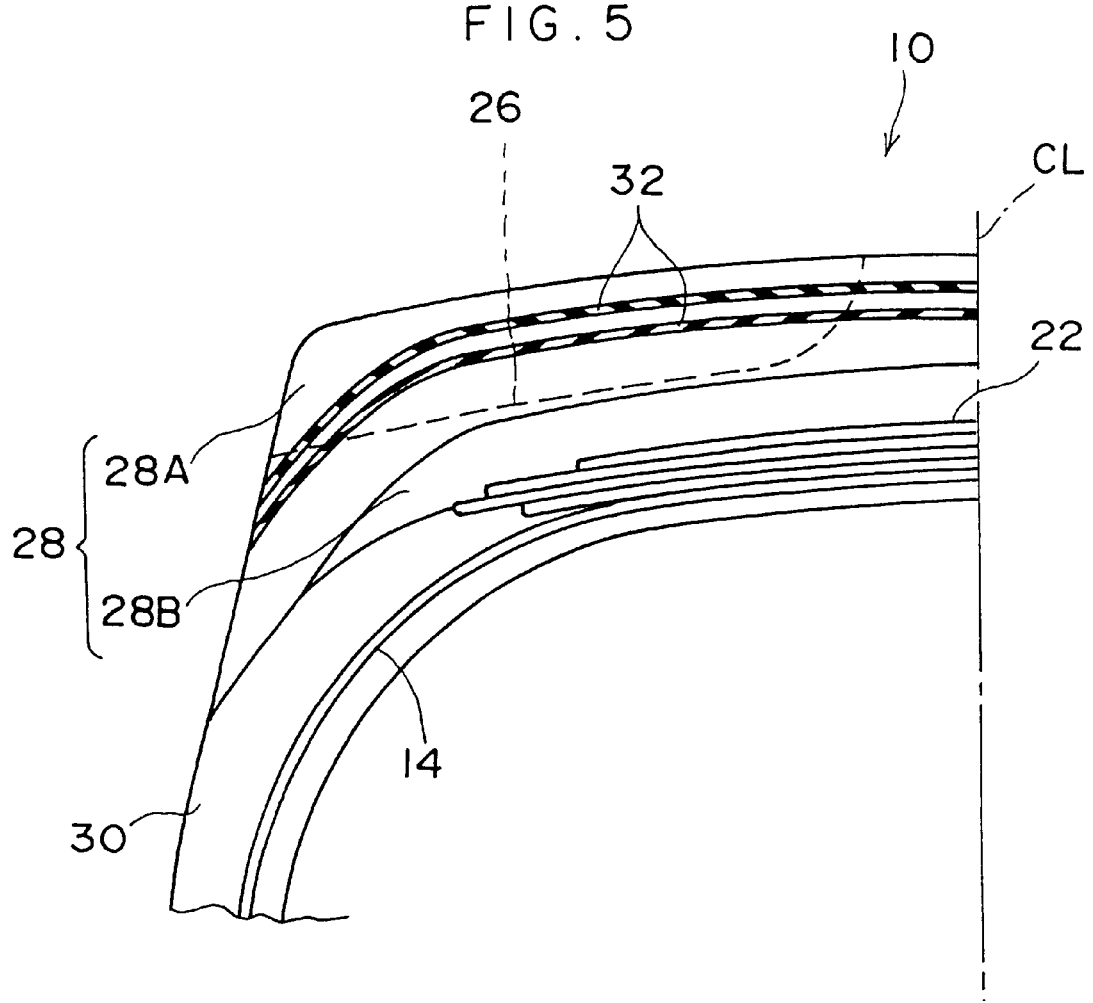
FIG. 5 is a cross-sectional view of a vicinity of a tread of a pneumatic tire relating to a still further embodiment of the present invention.
Figure 6:
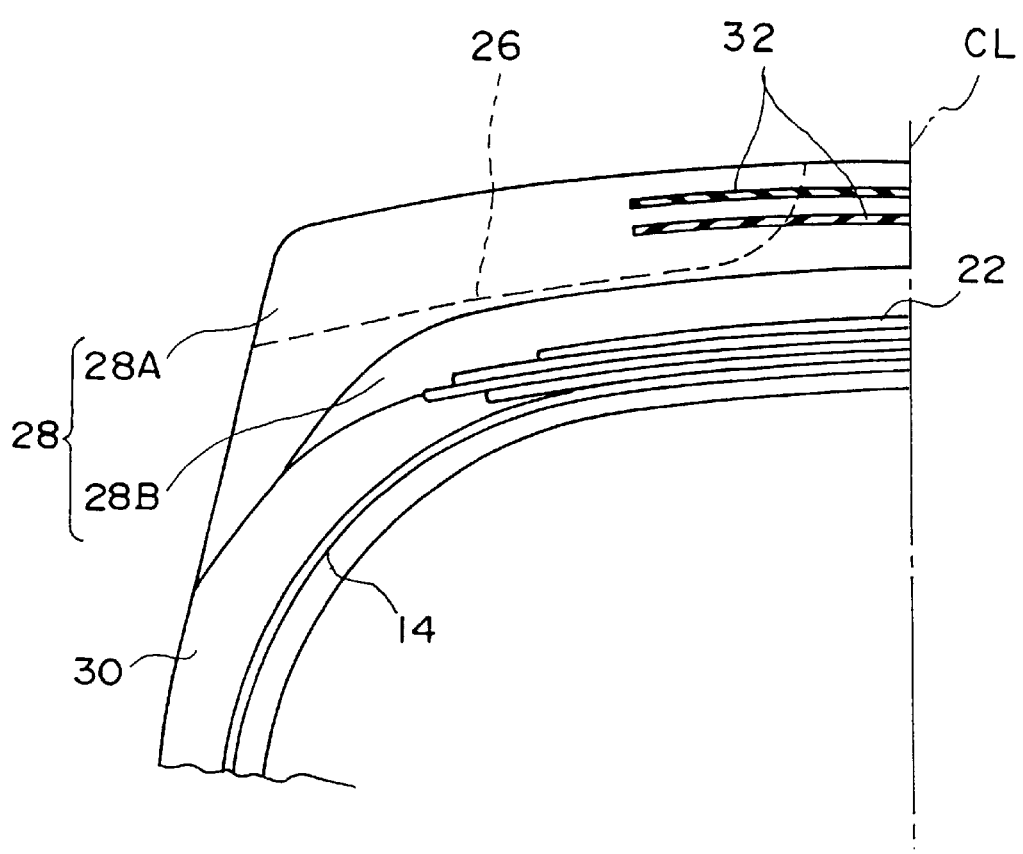
FIG. 6 is a cross-sectional view of a vicinity of a tread of a pneumatic tire relating to an additional embodiment of the present invention.
Figure 7:
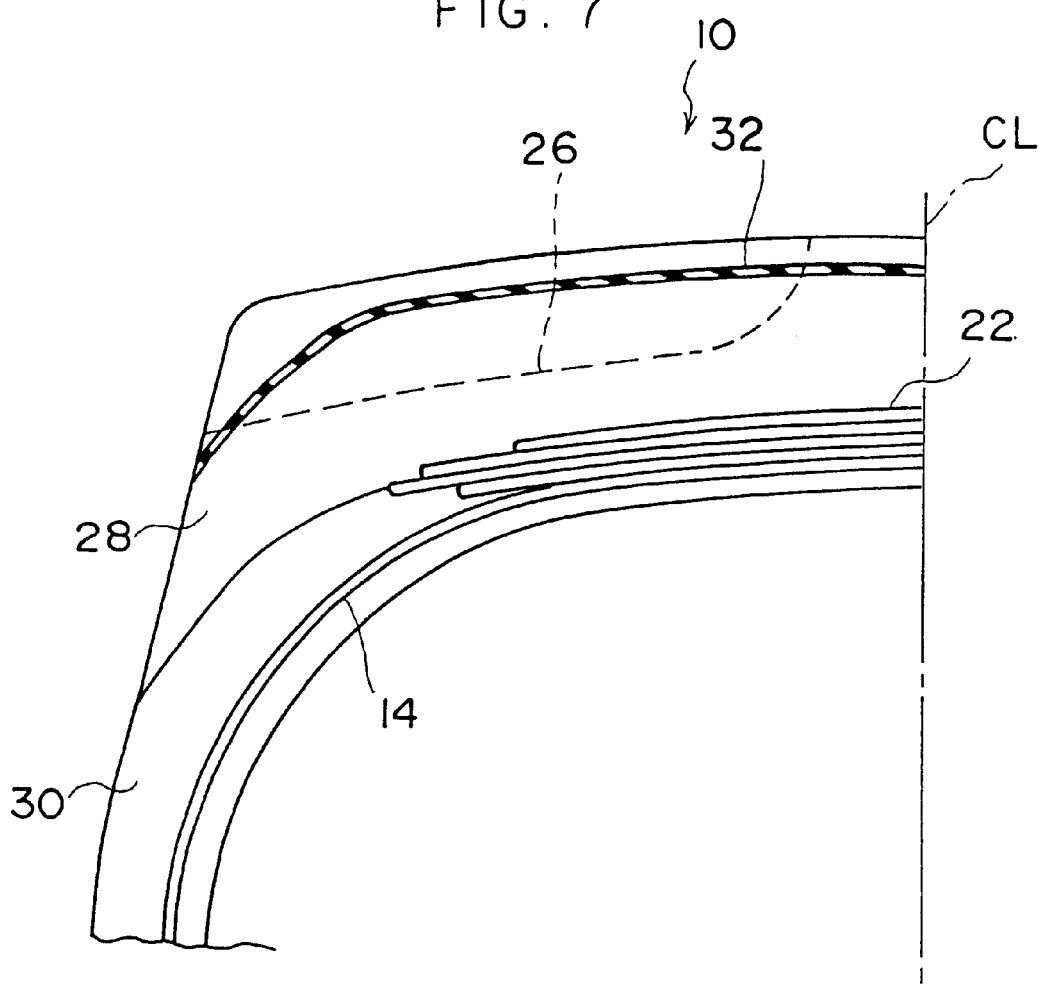
FIG. 7 is a cross-sectional view of a vicinity of a tread of a pneumatic tire relating to yet another embodiment of the present invention.
Figure 8:
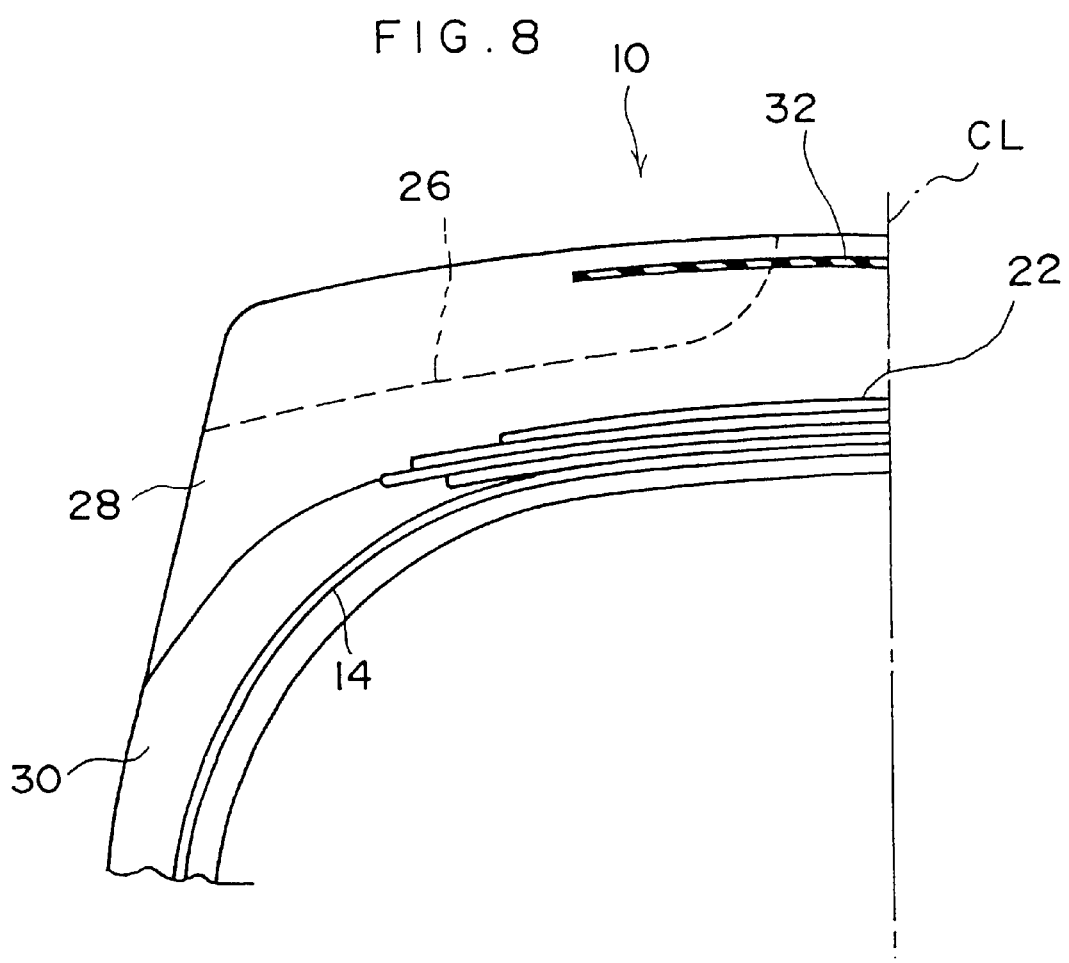
FIG. 8 is a cross-sectional view of a vicinity of a tread of a pneumatic tire relating to still yet another embodiment of the present invention.
Figure 9:
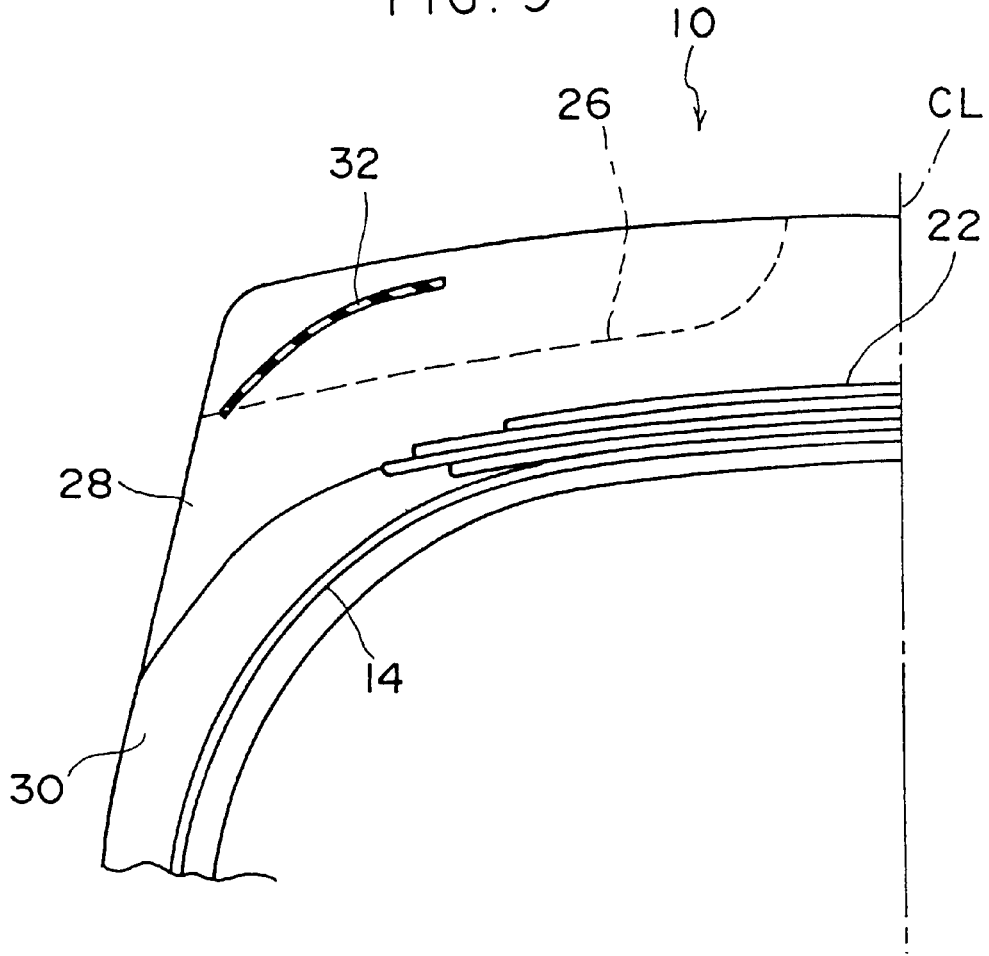
FIG. 9 is a cross-sectional view of a vicinity of a tread of a pneumatic tire relating to still yet another embodiment of the present invention.
Figure 10:
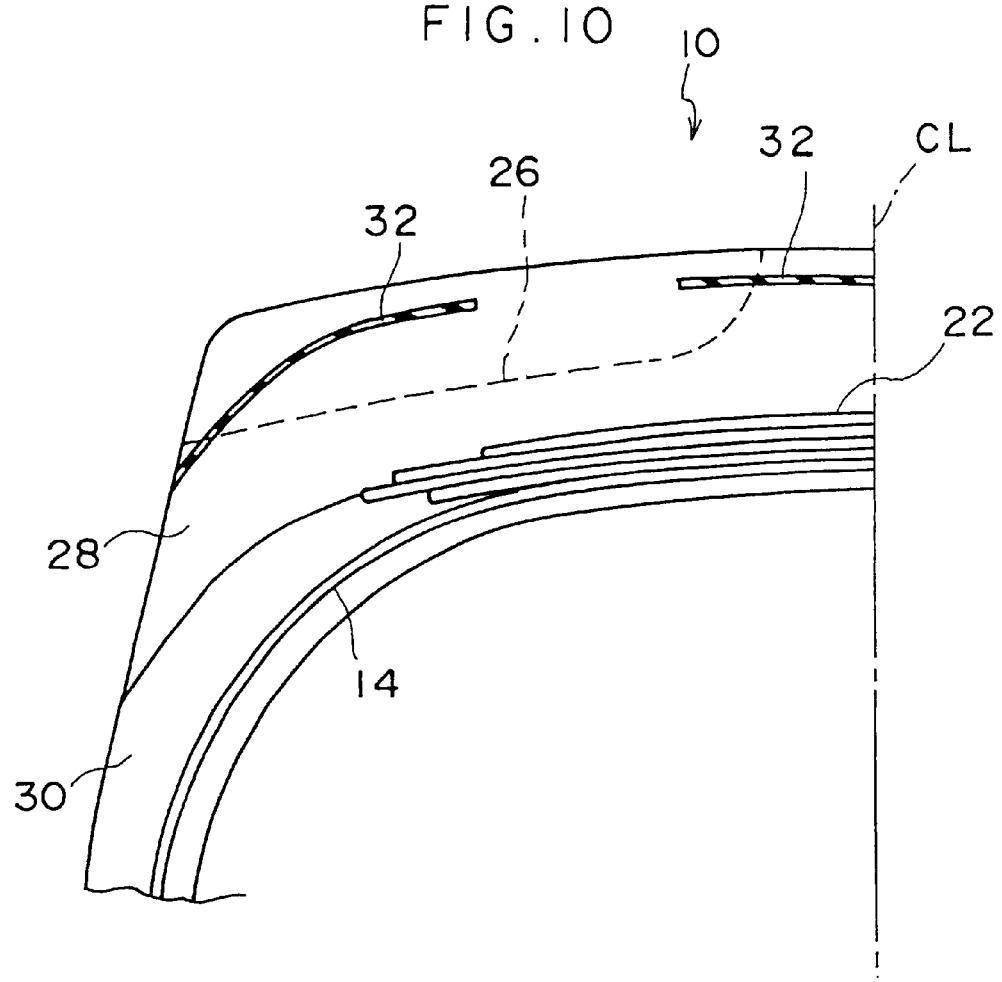
FIG. 10 is a cross-sectional view of a vicinity of a tread of a pneumatic tire relating to still yet another embodiment of the present invention.
Figure 11:
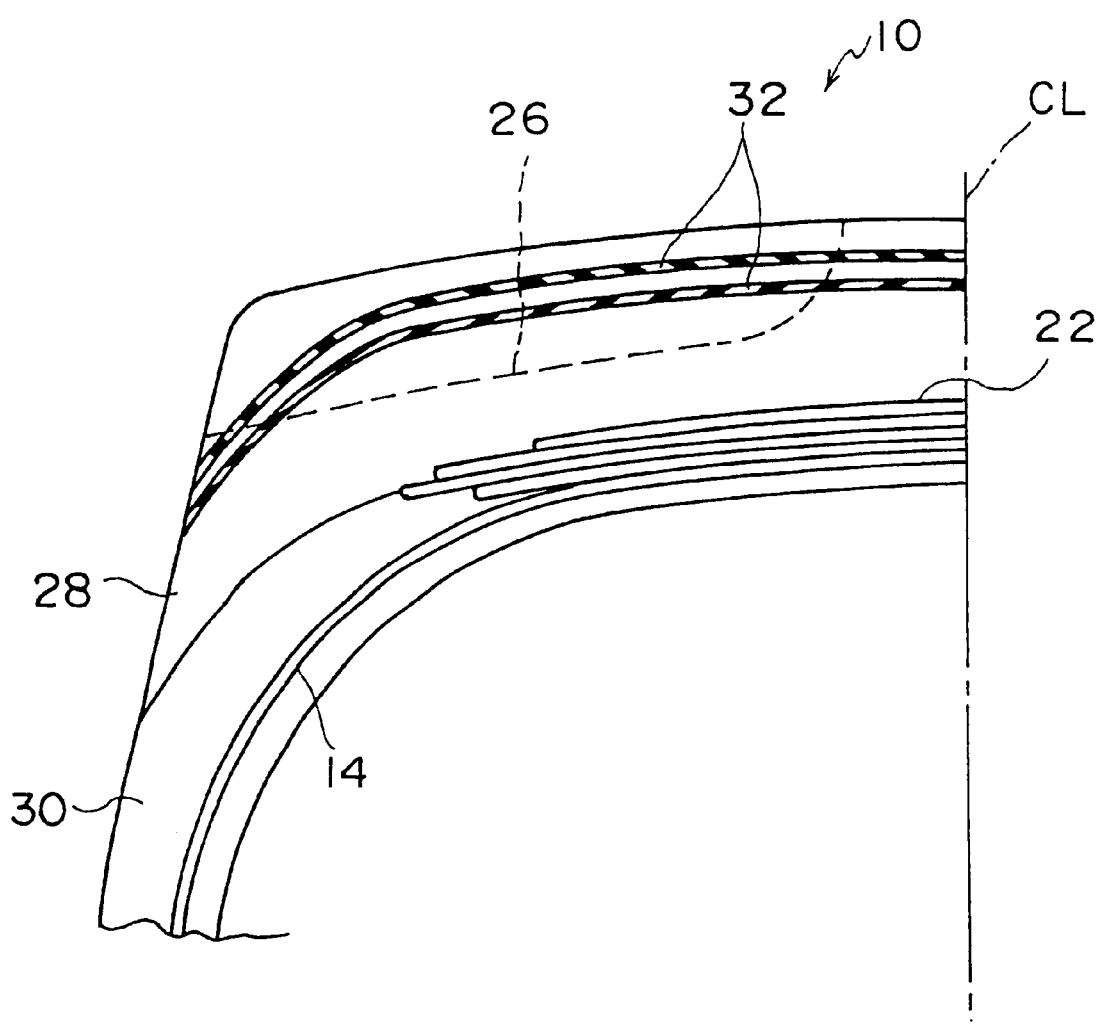
FIG. 11 is a cross-sectional view of a vicinity of a tread of a pneumatic tire relating to still yet another embodiment of the present invention.
Figure 12:
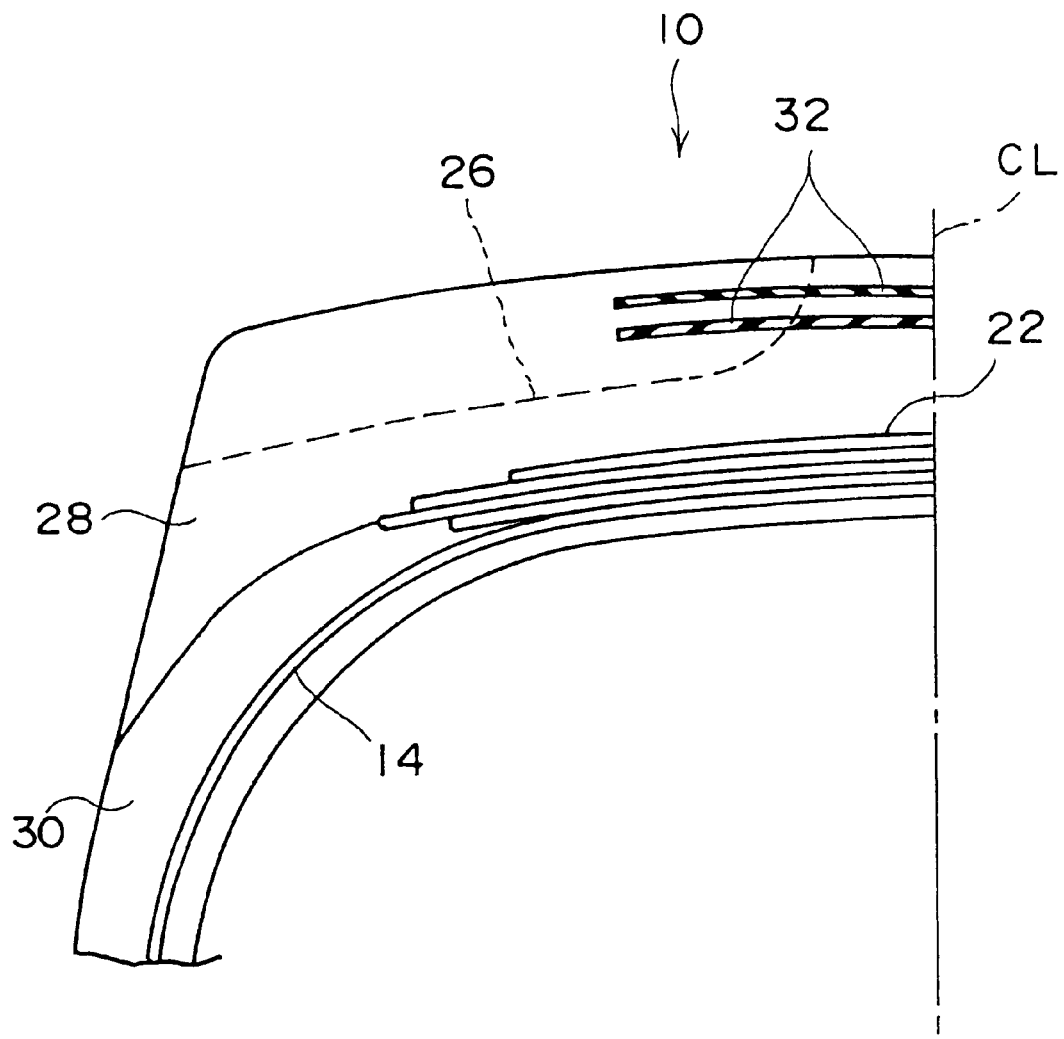
FIG. 12 is a cross-sectional view of a vicinity of a tread of a pneumatic tire relating to still yet another embodiment of the present invention.

For example, as shown in FIG. 5, two tread reinforcing rubber layers 32 may be provided such that the tread reinforcing rubber layers 32 extend in the tire circumferential direction and the tire widthwise direction over the entire cap rubber layer 28. Alternatively, as shown in FIG. 6, two tread reinforcing rubber layers 32 may be provided only in the vicinity of the center of the tread.

By providing a plural layers of tread reinforcing rubber layers 32, the amount of deformation of the tread rubber layer 28 can be suppressed.

Further, although the tread rubber layer 28 in the pneumatic tire 10 of the above embodiment has a two-layer structure (a "cap-base structure"), a single-layer structure made up of a single rubber material may also be employed.

Examples of the single-layer structure in which the tread rubber layer 28 is made up of a single rubber material include the structures shown in FIG. 6 through FIG. 12.

As generally known, front and rear pneumatic tires mounted on a vehicle are removed and re-mounted at different positions in an adequate time span.

In case of construction vehicles, the first removal and re-mounting of the tires is generally carried out at the time when, for example, the tread rubber layer 28 is worn by 30%.

In the pneumatic tire 10 of the present embodiment, the timing of removal and re-mounting of the tires at different positions can be visually determined by the change of color (color, brightness and saturation) of the tread surface at the time when the tread rubber layer 28 is worn by 30% if the following conditions are satisfied: the tread reinforcing rubber layer 32 is disposed at a position as deep as the tread surface when the tread rubber layer 28 is worn by 30% (i.e., the depth d at which the tread reinforcing rubber layer 32 is provided, measured from the tread surface of the tread rubber layer 28, is set to be 30% of the depth D of the lug groove 26 of a new tire); and the rubber composing the tread reinforcing rubber layer 32 has different color (color, brightness and saturation) than that of the rubber composing the tread rubber layer 28.

Because black rubber is commonly used for tires, any color other than black, such as white, red, yellow, green, or blue, can be used for the tread reinforcing rubber layer 32. If the same black is used for the tread reinforcing rubber layer 32, it suffices if the color (color, brightness and saturation) is altered.

In order to change the color (color, brightness and saturation) of a rubber, known methods in the art can be employed. These method include adding pigments in the rubber in the kneading process thereof or the like.

Further, although the tread reinforcing rubber layer 32 which is constituted with only rubber is buried in the cap rubber layer 28A in the aforementioned embodiment, short fibers may be mixed into the tread reinforcing rubber layer 32. The length of the short fibers is preferably in a range of 10 to 1000 $\mu$m. The average diameter of the short fibers is preferably no larger than 1 $\mu$m and more preferably in a range of 0.05 to 0.8 $\mu$m.

It is preferable that the material (e.g., rubber) of the tread reinforcing layer containing the short fibers have tensile modulus of elasticity which is higher than that of the rubber constituting the cap rubber layer 28A. In addition, it is preferable that the short fibers are oriented in a plane which is substantially parallel to the surface of the tread reinforcing rubber layer 32.

Further, because the direction in which the tread rubber layer 28 is less stretchable can be controlled by the orientation of the aforementioned fibers, it is preferable to set the orientation of the fibers to a direction in which suppressing heat-generation in the tread rubber layer 28 can be most effectively achieved.

Yet further, the tread reinforcing rubber layer 32 can be prepared by adding short fibers in the rubber of the same type as that composing the cap rubber layer 28A. As a result, a common rubber can be used for both the cap rubber layer 28A and the tread reinforcing rubber layer 32.

In the tread reinforcing rubber layer 32, the rubber may be the main constituent. That is, the proportion (by volume) of the rubber may be 50% or more).

Figure 13:
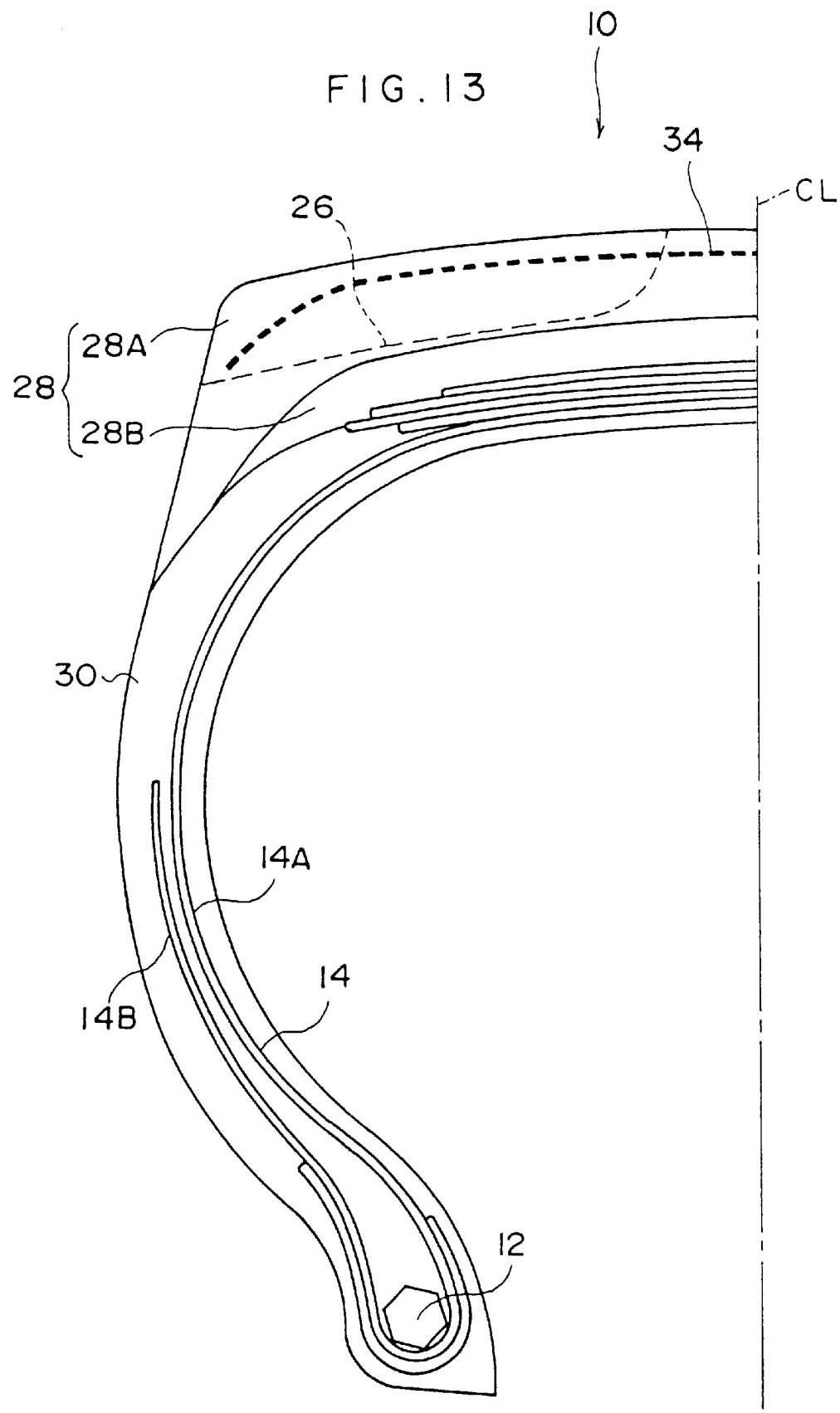
FIG. 13 is a cross-sectional view of a vicinity of a tread of a pneumatic tire relating to still yet another embodiment of the present invention.
Figure 14A:
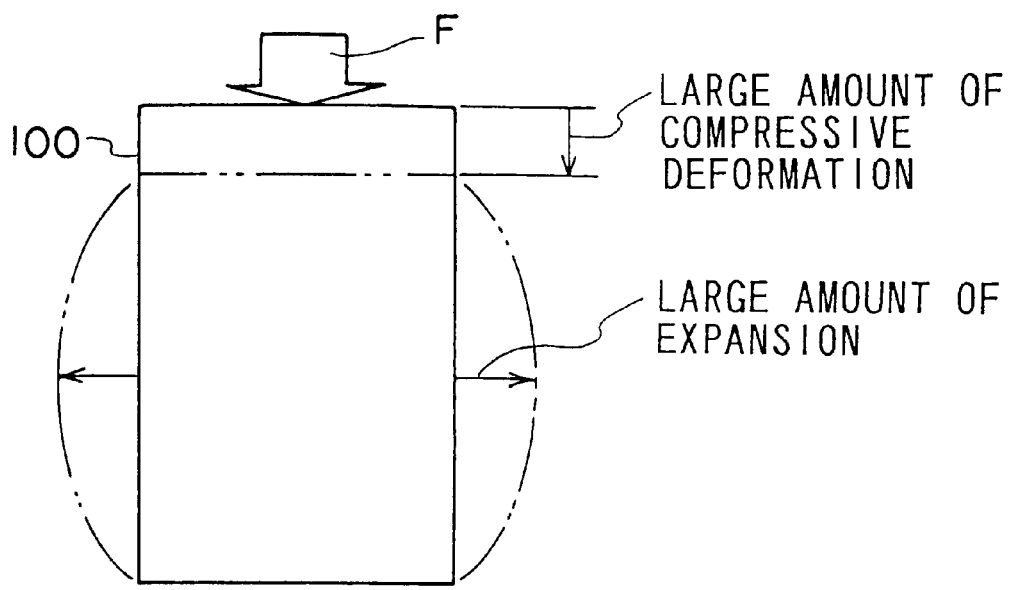
FIG. 14A is a cross-sectional view illustrating a state of deformation of a conventional tread.
Figure 14B:
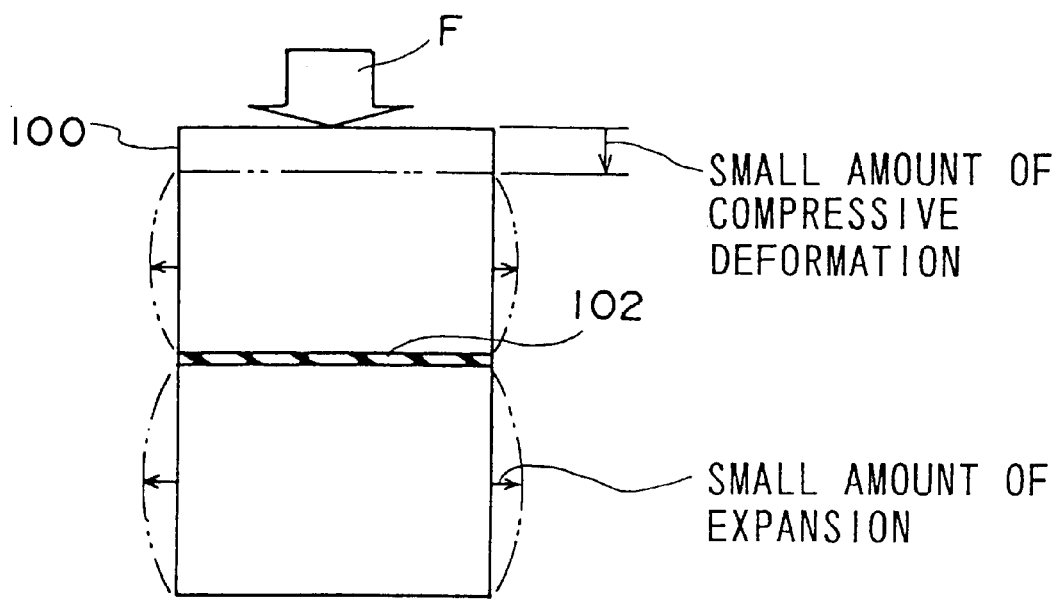
FIG. 14B is a cross-sectional view illustrating a state of deformation of a tread of the present invention.

Further, although the tread reinforcing rubber layer 32 is buried in the cap rubber layer 28A in the aforementioned embodiment, a rubber-fiber composite structure layer 34, instead of the tread reinforcing rubber layer 32, may be buried in the cap rubber layer 28A as shown in FIG. 13 so that the rubber-fiber composite structure layer 34 is substantially parallel to the tread surface.

The rubber-fiber composite structure layer 34 includes at least fibers. Examples of the rubber-fiber composite structure layer 34 includes a fabric made of long fibers, anonwoven fabric, and the like.

It is preferable that the physical properties, such as the tensile stress at 50% elongation, of the rubber-fiber composite structure layer 34 are set similarly to those of the tread reinforcing rubber layer 32.

Fibers composing the rubber-fiber composite structure layer 34 may be natural fibers such as cotton, silk, or wool, synthetic fibers such as nylon, polyester, rayon, or aramide, or inorganic fibers such as steel, carbon, or glass.

Thickness of the rubber-fiber composite structure layer 34, depth at which the rubber-fiber composite structure layer 34 is buried, and the like are set similarly to those of the tread reinforcing rubber layer 32.

In addition, in order that exposure of the rubber-fiber composite structure layer 34 at the tread surface is easily recognized, it is preferable that the color of the fibers are different from that of the rubbers composing the tread rubber layer 28 as is the case with the tread reinforcing rubber layer 32.

Further, because the direction in which the tread rubber layer 28 is less stretchable can be controlled by the orientation of the fibers in the rubber-fiber composite structure layer 34, it is possible to set the orientation of the fibers to a direction in which suppressing heat-generation in the tread rubber layer 28 can be most effectively achieved.

EXAMPLES

In order to confirm the effects of the present invention, a conventional tire and a tire of the present examples according to the present invention were prepared. Each of the tires was mounted to a standard rim prescribed in the industrial standards of JATMA and inflated at the standard inner pressure prescribed in JATMA, then mounted to a test car. The test car was driven for 24 hours under a constant condition (running on a general construction road with a load of 60 t). Thereafter, temperatures at the uppermost layer surface of the belt, at the two sites of the tread center portion along the tire circumference (i.e., the equatorial centerline plane) of the left front tire were measured.

The tire of the present example was the pneumatic tire which had the structure described in the aforementioned embodiment.

The conventional tire basically had the same structure as that of the tire of the present example, except that a cap rubber layer of the same thickness as that of the tread reinforcing rubber layer was provided instead of the tread reinforcing rubber layer. The tread gage was the same as that of the tire of the example.

The tire size of each tires was 40.00R57.

Test results were shown in Table 1 below.

TABLE 1

|  | Comparative Example | Example |
|---|---|---|
| Temperature 1 | 104.3° C. | 100.1° C. |
| Temperature 2 | 103.8° C. | 98.8° C. |
| Average Temperature | 104.1° C. | 99.5° C. |

As the test results indicate, the internal temperature of the tread of the pneumatic tire of the present example is significantly low as compared with that of the conventional tire. That is, the effect of the present invention has been well demonstrated in the results of the present example.

As described above, the pneumatic tire of the present invention having the aforementioned structure exhibits excellent effects in that reliable suppression of heat-generation and high tire wear resistance can be simultaneously achieved.

What is claimed is:

1. A pneumatic tire comprising:

tread portion constituted with a tread rubber layer and including grooves formed at a radially outer tread surface; and a thin tread reinforcing layer provided at a position, in the thickness direction, of the tread rubber layer so as to be situated above bottoms of the grooves and extend over at least one portion of the tread rubber layer in the tire widthwise direction thereof, the tread reinforcing layer being composed of a material having larger tensile modulus of elasticity than that of a rubber composing the tread rubber layer, wherein the tread rubber layer is made up of a plurality of rubber layers stacked in the tire radial direction, each of the plurality of rubber layers having different physical properties, and the thin tread reinforcing layer is embedded in the outermost rubber layer in the tire radial direction.

2. The pneumatic tire of claim 1, wherein the tread reinforcing layer is a thin tread reinforcing rubber layer composed of a rubber having larger tensile modulus of elasticity than that of the rubber composing the tread rubber layer.

3. The pneumatic tire of claim 2, wherein a thickness of the tread reinforcing rubber layer is in the range of 2 to 5% of a thickness of the tread rubber layer.

4. The pneumatic tire of claim 2, wherein a tensile stress at 50% elongation of the rubber composing the tread reinforcing rubber layer is in a range of from 2 to 4 times as large as a tensile stress at 50% elongation of the rubber composing the tread rubber layer.

5. The pneumatic tire of claim 2, wherein a position depth that is a distance from the tread surface to the outer side of the tread reinforcing layer in the thickness direction when the tire is new is in a range of from 10 to 30% of a depth of a groove of a new tire.

6. The pneumatic tire of claim 2, wherein a rubber composing the tread reinforcing rubber layer has different color, brightness and saturation than that of a rubber composing adjacent tread rubber layer.

7. The pneumatic tire of claim 6, wherein the depth, at which the tread reinforcing rubber layer is provided, measured from the tread surface of the tread rubber layer is set to be 30% of the depth of the groove of a new tire.

8. The pneumatic tire of claim 2, wherein short fibers are added in the tread reinforcing rubber layer.

9. The pneumatic tire of claim 8, wherein the short fibers are oriented in a plane which is substantially parallel to the surface of the tread reinforcing layer.

10. The pneumatic tire of claim 1, wherein the tread reinforcing layer is a rubber-fiber composite structure layer including fibers having larger tensile modulus of elasticity than that of the rubber composing the tread rubber layer.

11. The pneumatic tire of claim 10, wherein the rubber-fiber composite structure layer is disposed substantially parallel to the tread surface.

* * * * *